United States Patent [19]

Cummings

[11] Patent Number: 4,587,128
[45] Date of Patent: May 6, 1986

[54] PROCESS FOR MAKING A SNACK FOOD PRODUCT

[75] Inventor: Raymond P. Cummings, Franklin Lakes, N.J.

[73] Assignee: Borden, Inc., Columbus, Ohio

[21] Appl. No.: 645,701

[22] Filed: Aug. 30, 1984

[51] Int. Cl.⁴ .......................................... A21D 13/08
[52] U.S. Cl. ................... 426/303; 425/376 R; 425/301; 118/24; 226/200; 426/305; 426/94
[58] Field of Search ............. 426/94, 95, 302, 303, 426/305, 289, 291, 292, 293, 295

[56] References Cited

U.S. PATENT DOCUMENTS

| | | | |
|---|---|---|---|
| 1,462,883 | 8/1923 | Cloud | 426/293 |
| 1,942,423 | 1/1934 | Henry | 426/94 |
| 2,198,726 | 4/1940 | Shwom et al. | |
| 2,434,339 | 1/1948 | Stiles . | |
| 2,439,899 | 4/1948 | Monaco | 426/305 |
| 2,696,793 | 12/1954 | Oakes . | |
| 2,878,127 | 3/1959 | Forkner . | |
| 2,967,493 | 1/1961 | Cloud et al. | |
| 3,117,871 | 1/1964 | Bahr et al. | |
| 3,186,359 | 6/1965 | Centrone . | |
| 3,278,314 | 10/1966 | Colby et al. | |
| 3,552,980 | 1/1971 | Cooper et al. | |
| 3,615,591 | 10/1971 | Newlin . | |
| 3,646,894 | 3/1972 | Haster et al. | 426/503 |
| 3,670,665 | 6/1972 | Levi . | |
| 3,821,452 | 6/1974 | Hayashi . | |
| 3,969,514 | 7/1976 | Tiemstra . | |
| 4,159,348 | 6/1979 | Dogliotti | 426/303 |
| 4,276,317 | 6/1981 | Hayashi | 426/503 |
| 4,293,572 | 10/1981 | Silva et al. | |
| 4,401,681 | 8/1983 | Dahle . | |
| 4,421,771 | 12/1983 | Stock et al. | 426/94 |

OTHER PUBLICATIONS

Family Circle Illustrated Library of Cooking, vol. 4, 1972, The Family Circle Inc., pp. 409,428,429,452,468 and 469.

Primary Examiner—Raymond N. Jones
Assistant Examiner—Carolyn Paden
Attorney, Agent, or Firm—Robbins & Laramie

[57] ABSTRACT

Snack food product in which a piece of cake is coated with a fruit jelly or a creme bonding layer and with a sticky icing over the bonding layer. The process for making the product includes applying a pressure bearing member to the icing to press it into intimate contact with the bonding layer and to press the bonding layer into the cake. The pressure bearing member and cutting knives may be heated to avoid sticking.

2 Claims, 22 Drawing Figures

PROCESS FOR MAKING A SNACK FOOD PRODUCT

BACKGROUND OF THE INVENTION

1. Field of the Invention

This invention relates to a snack food product and to a process and equipment for making it. More particularly, the invention relates to an iced piece of cake that is processed to obtain good adhesion between the layer of icing and the cake. In addition, the iced piece of cake is completely enrobed in a hardened enrobing layer of sweet chocolate or the like. The process and equipment are highly automated and capable of high speed production.

2. Description of the Prior Art

Snack foods of the iced cake type are very popular. Unfortunately, when produced by conventional techniques, they are also costly, in part because in conventional production processes a substantial amount of manual labor has been involved. Also, processes developed in the past often produced, inherently, a high level of waste.

SUMMARY OF THE INVENTION

In one preferred embodiment, a food product according to the invention comprises a piece of cake that has a generally planar upper surface, over which a layer of icing is coated. This icing layer is treated for good adhesion or bonding to the cake. The iced piece of cake is completely enrobed in a hardened enrobing layer of sweet chocolate or the like.

The term "icing" usually refers to a sweet composition made from sugar, butter, milk or egg white, and flavoring. In practicing the present invention, an icing-like topping may be made from different ingredients, including peanut butter, dextrose sugar, milk, food grade starch, water, and one or more emulsifying agents. With such a formulation, the peanut butter contributes protein, fat, and carbohydrate, as well as flavor. No butter is needed, although some may be used if desired. The term "icing" is used herein to refer to icings made in the conventional way and, as well, to peanut butter toppings such as the one described, where little or no fat is used other than that contributed by the peanut butter.

In some cases, where the icing is somewhat fluid and bonds readily to the cake surface, good bonding is assured, together with an even thickness, by pressing the icing layer against the cake. Generally this is accomplished by passing the iced cake under a compression roller.

In some preferred embodiments of the invention, however, the icing layer tends to be sticky. Then any attempt to cut the iced cake into convenient sized pieces for enrobing and packaging results in sticking of the icing to the cutting tool, so that the icing pulls away from the cake. Preferably, therefore, when a sticky icing is used, a bonding layer is applied directly to the cake, and the sticky icing is applied to the bonding layer, so that the bonding layer assits in anchoring the icing to the cake. Preferred bonding layers are easily formed by the application of a layer of a fruit jelly or of a creme to the cake surface prior to the application of the icing.

For present purposes, a "creme" is a formulation of a kind well known in the baking industry. It is a fluid or flowable emulsion, composed of fat, sugar, water, emulsifiers, milk, powder and/or starch and flavoring agents. Such emulsions are generally referred to as "cremes" because they usually have the appearance, texture, and mouth-feel of dairy-type cream fillings, without necessarily containing real dairy cream. Such emulsions are often used as fillings and have long shelf lives without refrigeration. In a peanut butter based creme, much of the fat content may be derived from its peanut butter content.

To reduce the cost and permit high speed production of the desired product, an automated production line is used. Preferably, batter is extruded onto a conveyor belt at the input end of the line. The batter is baked during passage through a tunnel oven, followed by cooling on a cooling conveyor. The cake is preferably inverted prior to use, to present a planar surface for the creme or jelly and icing layers that may be applied. If desired, a rotary brush may be used to roughen the cake surface, to improve the bonding of an applied layer. The resulting cooled cake ribbon is then slit lengthwise, that is, in a preferred embodiment, along the direction of movement, so that several ribbons of cooled baked cake are formed.

Next, if a sticky icing is to be used, an application of either a jelly layer or a creme layer is applied to the upper surface of each ribbon of the cake, then a layer of the sticky icing is applied. If the icing is not sticky, it may be applied directly to the cake. Next, a pressure roller is applied to the icing, to compress it, to insure good contact and bonding between the cake, the bonding layer if used, and the icing layer. The compression roller also pressed walnuts or any other decorative ingredient into the icing. The iced cake ribbons are then cut transversely to form small geometrically-shaped, preferably square-shaped pieces. Finally, each iced piece of cake is enrobed in an enrobing machine, cooled to solidify the enrobing material, and packaged in automatic packaging machinery.

DETAILED DESCRIPTION OF THE PREFERRED EMBODIMENTS

The Product

Referring now in detail to the drawings by numerals of reference, the numeral 20 (FIG. 1) denotes generally a snack food product made in accordance with one preferred embodiment of this invention. This snack food product comprises a cake 22 that is the largest component of the product in size. The cake 22 may be about two inches square and about one-half inch deep. In geometrical terms, it is in the form of a parallelipiped. It could be made in any other desired geometric shape, but a square shape is preferred.

Figure 1:
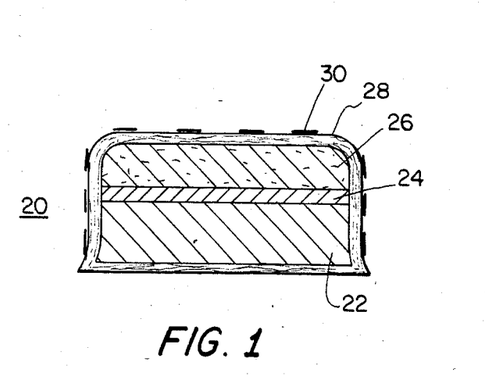
FIG. 1 is a section, in a vertical plane, through a snack food product made in accordance with one preferred embodiment of the product invention.

A bonding layer 24 of creme or jelly is coated over the upper surface of the cake 22 and generally is substantially coextensive with the cake surface. As applied, the bonding layer 24 is sufficiently fluid to penetrate into the porous structure of the body of the cake, so that this bonding layer itself is firmly anchored to the cake. The bonding layer should be sufficiently cohesive to resist being pulled apart. Generally it is either a fruit jelly or a creme. In this illustrated embodiment of the invention, it may be a peanut butter creme.

A layer 26 of sticky icing, such as a sticky peanut butter icing, is coated over the bonding layer 24 of peanut butter creme, and is generally coextensive with it. The composition of the bonding layer 24 and that of the icing layer 26 are so selected as to "wet" each other and cohere. Such bonding is generally sufficient to hold the icing in place on the cake, even though the icing layer alone, without the bonding layer, would lift off the cake easily in subsequent processing steps. This is important in the manufacturing process, where there are several opportunities for the thick, sticky icing layer to stick to something other than the cake and get torn off the cake, in whole or in part.

This iced piece of cake is completely enrobed in a chocolate or equivalent enrobing layer 28 that has been cooled and solidified. Preferably it has a sufficiently high melting point to permit handling without melting. For aesthetic reasons, the enrobed cake has a decorative pattern of lines 30 of chocolate or other suitable coating material, having a different color than the color of the enrobing layer 28, applied over the top and sides of the enrobed cake. This pattern of lines is referred to hereafter as "squiggles".

Figure 2:
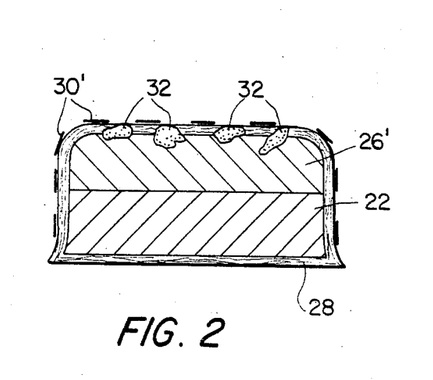
FIG. 2 is a section in a vertical plane of a different embodiment of a snack food product made in accordance with a process according to the invention.

Another snack food product is shown in FIG. 2. In this figure and elsewhere throughout the specification, like numerals denote like components and parts. In this embodiment of the invention, the cake 22 has a layer of icing 26' applied directly to the upper surface of the cake. The composition of the icing layer 26' is adjusted to be more adherent to the surface of the cake and less apt to stick to cutting knives and other items with which it might come in contact during the production process. Often this can be accomplished by modifying a conventional icing recipe by increasing its oil content. A plurality of pieces 32 of a particulate food, such as chopped walnuts, are distributed over the upper surface of the layer of icing 26', and have been pressed down into the icing layer. As with the embodiment shown in FIG. 1, the iced cake is enrobed in a layer of chocolate 28, which is decorated with squiggles 30' of a differently colored confectionery material, preferably chocolate.

Figure 3:
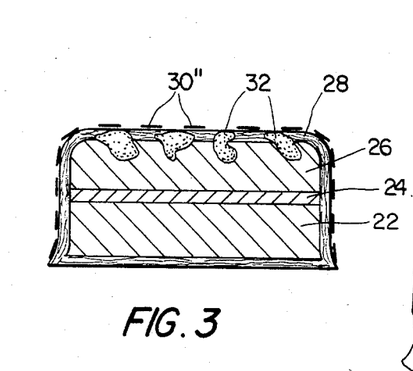
FIG. 3 is a section in a vertical plane of a snack food product made in accordance with another embodiment of the product invention.

In the embodiment illustrated in FIG. 3, some of the features of the snack food product shown in FIGS. 1 and 2 have been combined. Thus the base cake 22 is topped with a bonding layer 24, which in turn is covered by a layer of sticky icing 26. Pieces 32 of chopped walnuts or other particulate food are partially embedded in the icing layer, and the whole is enrobed in a layer of enrobing chocolate or equivalent 28. The decorative squiggles 30" are applied over the enrobing layer.

Figure 4:
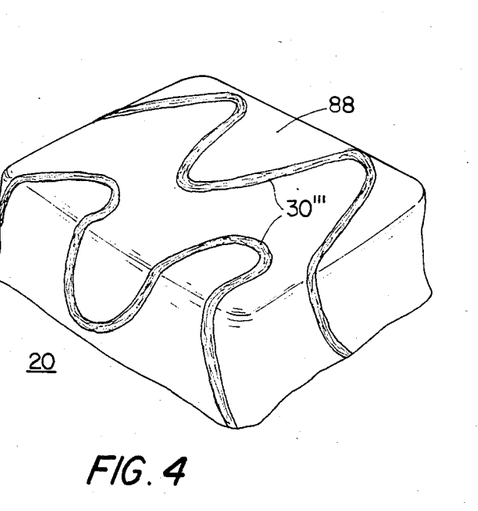
FIG. 4 is a perspective view of an enrobed, decorated snack food product.

In the perspective view shown in FIG. 4, the pattern of squiggles 30''' is visible against the differently colored enrobing layer 28.

The Production Process

Snack food products in accordance with the invention are preferably made by an essentially continuous process, on a highly automated production line, one embodiment of which is illustrated schematically in FIGS. 5A, 5B, 6A, and 6B. To follow the cake through the production line, in accordance with one preferred embodiment, batter is extruded (not shown) onto a steel conveyor belt to form a pair of ribbons of batter of equal size. These continuous twin ribbons of batter are then carried through a tunnel oven (not shown) where the batter is baked. The twin ribbons of cake are then transported on a foraminous conveyor through a cooling zone (not shown), and when firm enough, each is inverted onto one of two like conveyor belts 34, respectively, spaced from each other. The inversion insures that the exposed upper surface of each cake ribbon is generally planar.

Figure 5A:
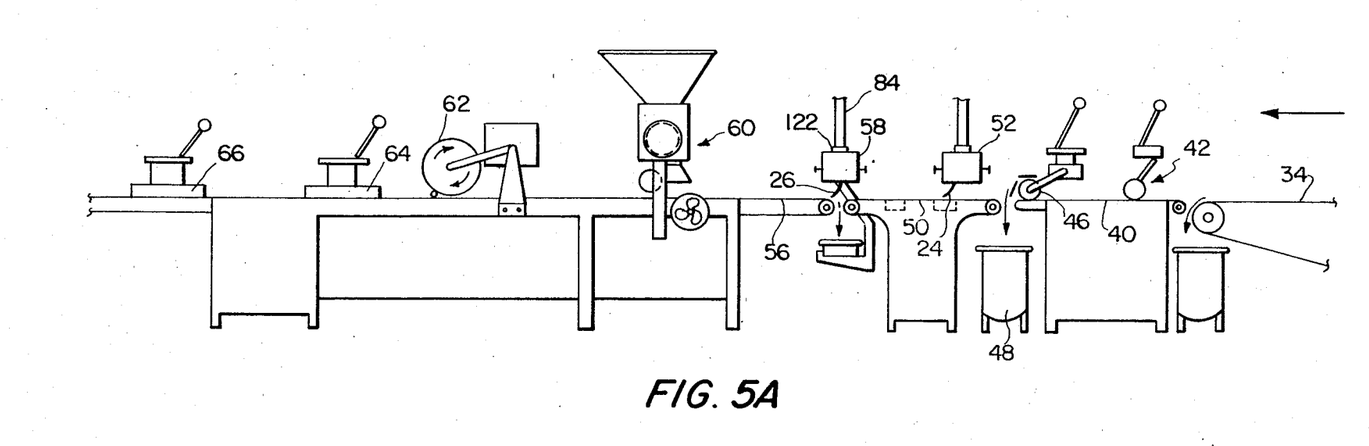
FIGS. 5A and 5B are fragmentary schematic diagrams showing, in side elevation, a production line in accordance with one embodiment of the invention, for the continuous production of snack food products in accordance with the invention, with the direction of travel of the cooled, baked cake ribbons through the production line indicated by a large arrow.
Figure 5B:
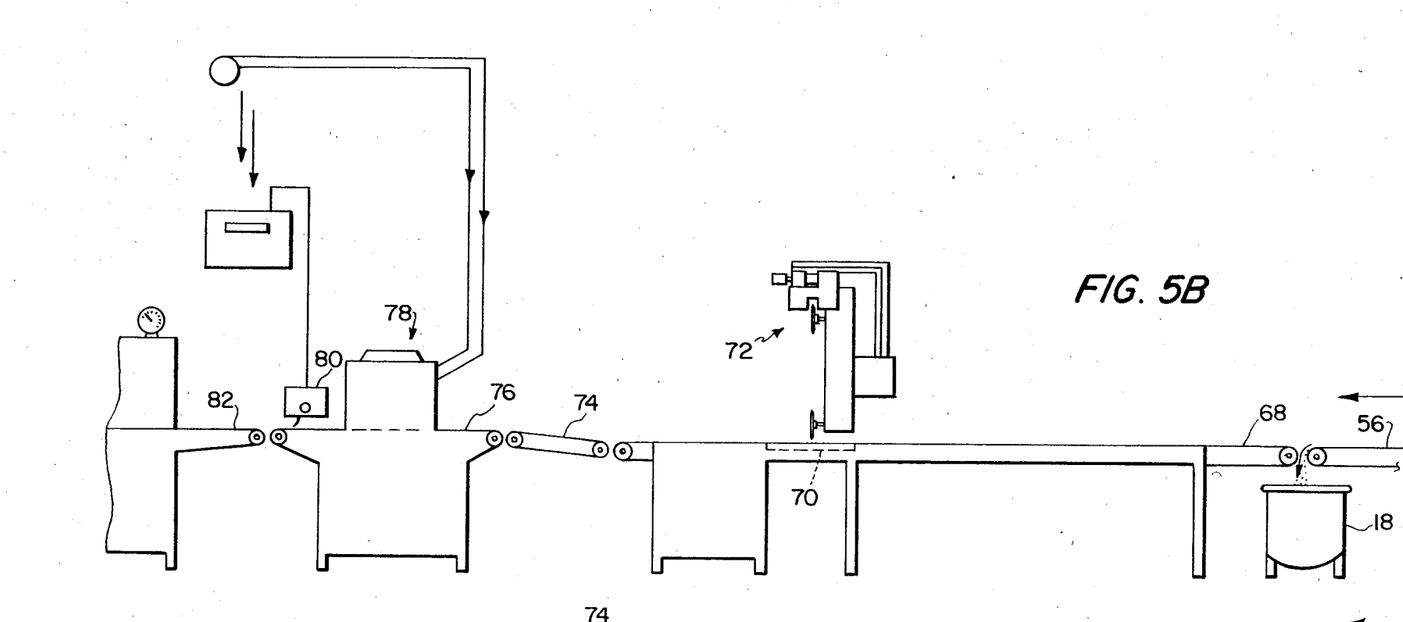
Figure 6A:
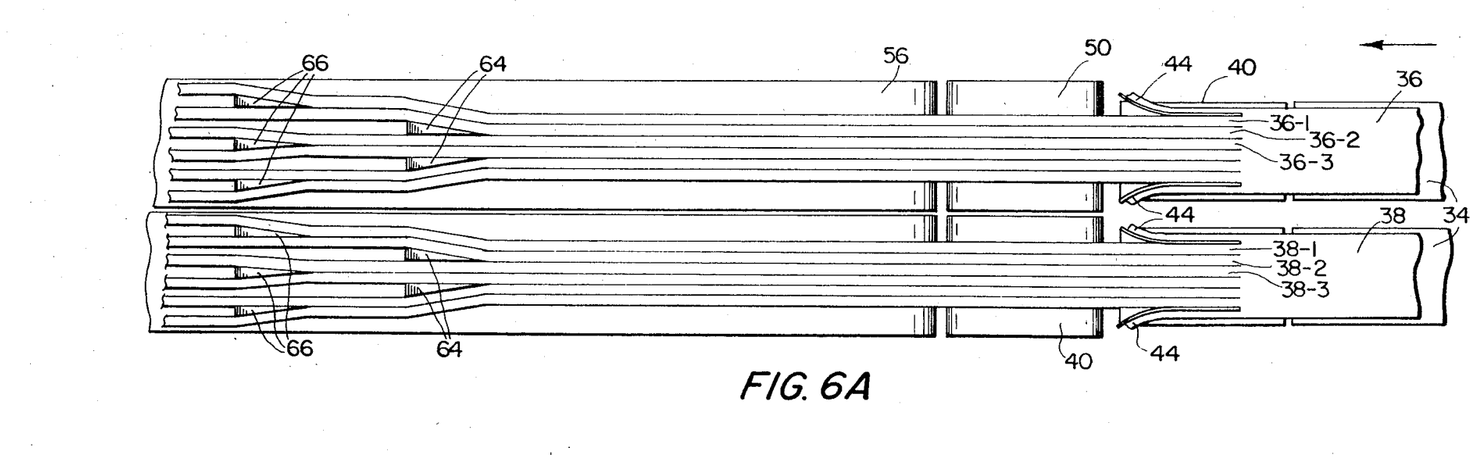
FIGS. 6A and 6B are fragmentary top plan views of the paths followed by the cooled, baked cake ribbons after leaving the cooling conveyor and being inverted, as they pass along the production line shown in FIGS. 5A and 5B, and are slit, cremed, iced, covered with walnuts or the like, and then the lanes are separated, then cut transversely into square-shaped or rectangular-shaped pieces, with the direction of travel of the cake ribbons through the production line indicated by a large arrow (no attempt is made in FIGS. 5 and 6 to show the coatings on the cakes)
Figure 6B:
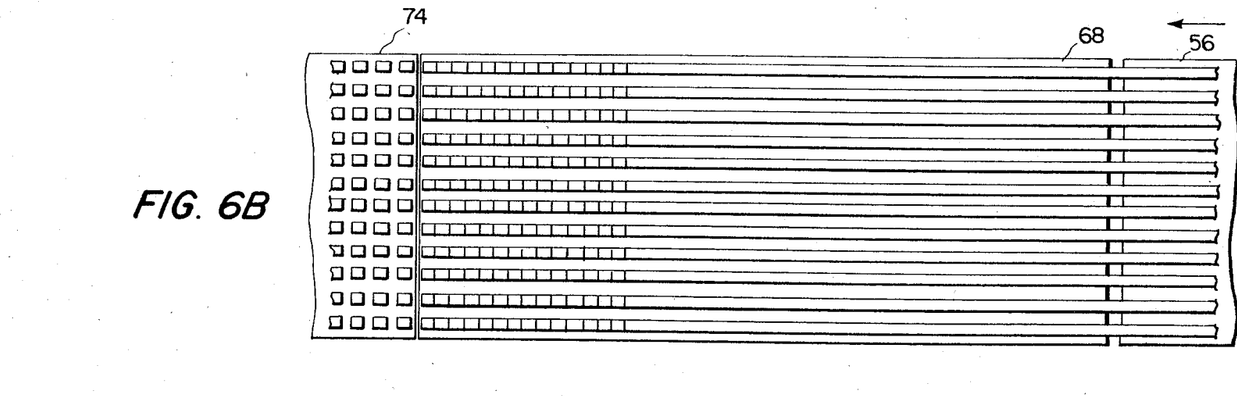

In FIGS. 5A and 6A, the two parallel ribbons of (inverted) baked cakes 36, 38 respectively, are carried on the twin conveyors 34 to be processed through successive work stations for the several operations that produce the final enrobed snack food product.

Upon reaching the first work station, the cake ribbons 36, 38 are transferred from the conveyor 34 onto twin conveyors 40 for the first work station. In this preferred embodiment, both cake ribbons 36 and 38 respectively are a little over 14" in width, to allow for conveyor tracking deviations. Both cake ribbons are cut at the first work station at the same time by gang rotary knives or slitters 42 (FIG. 5A), of which there are generally seven knives per gang per cake ribbon. The knives 42 are preferably made of stainless steel. They are individually spring loaded, constantly to press downwardly toward the surface of the twin conveyors 40. These twin conveyors 40 are preferably made from neoprene or the like, and the several knives or slitters are individually adjusted so that each engages against the surface of the respective underlying conveyor, but without enough force to damage the surface of the conveyor.

The knives 42 in each gang are 2" apart. Thus each cake ribbon is slit into six pieces 36-1, 36-2, 36-3, etc., and 38-1, 38-2, 38-3, etc., each two inches wide, and two marginal trim portions of cake are cut off each of the two cake ribbons, one at each side of each cake ribbon. The marginal trim portions 44 that are removed vary in width. The four marginal trim portions 44 are directed by guides 46 to drop off the sides of the twin conveyors 40 into a scrap collector bin 48.

The twelve 2" wide cake ribbons that are produced by this slitting procedure are transferred from the twin conveyors 40 of the first work station onto a single conveyor 50 at the second work station. At this second work station, the bonding layer 24, if needed, is applied by the extrusion of twelve ribbons of the bonding creme, fruit jelly, or like material simultaneously from an appropriate extrusion device 52 (FIGS. 5A and 7-10) onto the upper surfaces of the twelve cake ribbons respectively.

To prevent the twelve separate but contiguous coated cake ribbons from sticking to each other, it is preferred that the lateral margins of each strip of the bonding material be set back slightly from the lateral edges of the cake ribbon respectively to which it is applied. Thus the several extruded strips of bonding material 24 may be about 1¾" wide, as extruded, respectively, for cake ribbons that are 2" wide. When the bonding strip is properly centered on its cake, there is then a bare, uncoated marginal area on the top surface of each cake ribbon at each side of the cake.

The 12 cake ribbons, each now coated with a strip of bonding material, are then transferred from the conveyor system 50 at the second work station to a longer conveyor system 56 at the third work station. These two conveyor systems are spaced slightly apart. As the transfer is effected from one conveyor system to the other, strips of the icing layer 26 are applied from a suitable extrusion device 58 (FIGS. 7-10) that extrudes the icing 26 as twelve distinct, separate strips that are applied to the cake ribbons as they travel across the gap between the two conveyor systems. Preferably, the strip of icing that is applied to each cake ribbon is coextensive in width with the width of the cake ribbon.

As the iced cake ribbons are carried along on the conveyor 56, they are passed beneath a metering dispenser 60, which if desired drops a predetermined quantity of particulate food, such as chopped walnuts, for example, onto the surface of the icing. As the conveyor system 56 carries the iced cake ribbons further through the third work station, they are passed beneath a pressure roller 62. This roller applies sufficient compressive force to press the nuts or other food particles into the icing, presses the icing and underlying bonding layer together, and presses the bonding layer into the cake. The pressure roller 62 may be heated, chilled, or at room temperature, depending upon the characteristics of the icing with which it is to come into contact.

The twelve iced cake ribbons are then passed through a first set of four lane dividers 64, that accomplish a separation of the twelve previously contiguous cake ribbons into six contiguous pairs of cake ribbons (FIG. 6A). The cake ribbons are then passed through a second set of six lane dividers 66, that separate the six pairs respectively, to form twelve separate iced cake ribbons. These cake ribbons are then transferred to the conveyor system 68 for the fourth work station.

At this station the twelve separate cake ribbons are carried over a backup plate 70 and beneath a roll knife carriage 72. This knife assembly is of a known "rotary knife" type. The knife assembly is securely mounted at a specific location along the production path. The assembly has a gang of knives that are caused to travel through a generally rectangular path having rounded corners. In this path, the upper and lower reaches of the path are horizontal although skewed from each other as will be described presently, and the side reaches are generally upright. The upper reach of the path of knife travel is generally directly transverse to the direction of travel of the underlying conveyor belt, while the lower reach is skewed so that the rates of travel of the knife and of the belt are taken into account, so that as a knife travels across the belt through that lower reach, the cakes are cut at an essentially 90° angle. Put a different way, the path followed by a traversing knife, in cutting the iced cake ribbions, follows a line that is essentially transverse to the direction of travel of the belt.

The squares or rectangles thus formed are then passed over a transfer conveyor 74 that is operated at a linear speed greater than the speed of the conveyor 68 of the fourth work station, so that the individual squares are separated and become spaced from each other in their direction of travel, to permit enrobing all four sides of each square.

The separated squares are then transferred to the conveyor system 76 of the enrobing machine 78. After enrobing, the squiggles 30 are applied by a decorating applicator machine 80, and then are tranferred to a cooling conveyor system 82. The enrobed, squiggle-decorated squares are then carried on this conveyor system 82 through a cooling tunnel (not shown) so that the enrobing layer, generally of chocolate, solidifies. The final snack food product is then packaged, utilizing automatic packaging machinery.

This general procedure represents one preferred technique for the mass production of snack food products in accordance with the invenion. Many variations of this production process are feasible. For example, instead of extruding continuous batter ribbons, the batter could be deposited in appropriate lengths, so that instead of ribbons, separate blocks of batter were deposited on the conveyor to be carried through the oven and subsequently processed. Such a process variation has the advantage of permitting inspection of the several conveyor systems on a continuous basis, to be sure that there are no localized burn spots or the like. The spacing between adjacent blocks of cake could be adjusted to permit cleaning of the conveyor systems without stopping the production process completely.

As will be described in more detail later, the bonding layer of creme or jelly can in some cases be omitted. In such a case the icing should be formulated so that it is not sufficiently sticky to tend to pull off the underlying cake during the several subsequent processing steps after it is applied to the cake.

Much of the equipment involved in the practice of the process may be standard equipment, such as the tunnel oven that is used for baking the batter, and the cooling tunnel for cooling the chocolate. However, at some of the work stations, equipment has been developed that is believed to be particularly advantageous, as follows.

At the front end of the first work station, and icing depositor device 58 (FIGS. 7-10, inclusive) is disposed to extrude icing in twelve separate continuous ribbons, appropriately positioned to be deposited on the twelve underlying cake ribbons passing through that work station, respectively. This depositor device 58 is especially designed for the application of viscous icings, such as those having a fudge or a peanut butter base.

Referring now to FIGS. 5A, 7, 8, 9 and 10 in particular, the extrusion device 52 for the bonding layer, and the icing extrusion device 58, have the same structure and mode of operation. This description refers to the icing extruder 58, but generally is applicable to the jelly or creme extruder 52. The icing extruder 58 may be supplied with icing from a reservoir (not shown), that may be heated, using a positive displacement pump, preferably one of the progressing cavity type. The pump should be one that provides a uniform, non-pulsating, predictable volume of discharge and that has a capacity that is proportional to its speed of operation, or that can be regulated in some other convenient manner. The pump may draw icing from a hopper (not shown) that may be equipped with a hot water jacket, to maintain the icing at a temperature above room temperature, if desirable to lower viscosity.

The icing is supplied under pressure through a line 84 (FIG. 5A) to the icing extruder 58, by way of a manifold 122 (FIG. 5A) that communicates with the extruder through a pair of ports 118, 119 (FIGS. 7 and 8), as will be described in more detail below.

Figure 7:
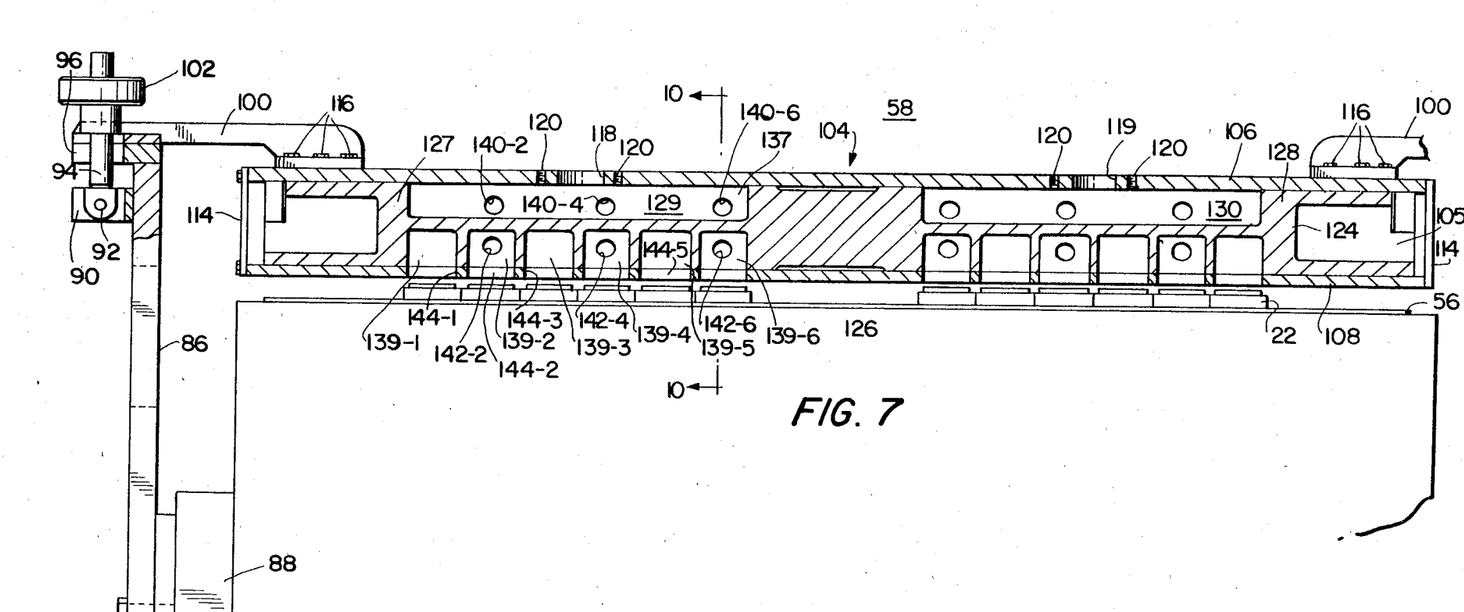
FIG. 7 is a fragmentary section in a vertical plane, taken on the line 7—7 of FIG. 8 looking in the direction of the arrows, the plane being transverse to the direction of movement of the cake ribbons in the production line, of a depositing machine for extruding strips of a viscous icing and applying them onto the individual cake ribbons respectively as they pass.
Figure 8:
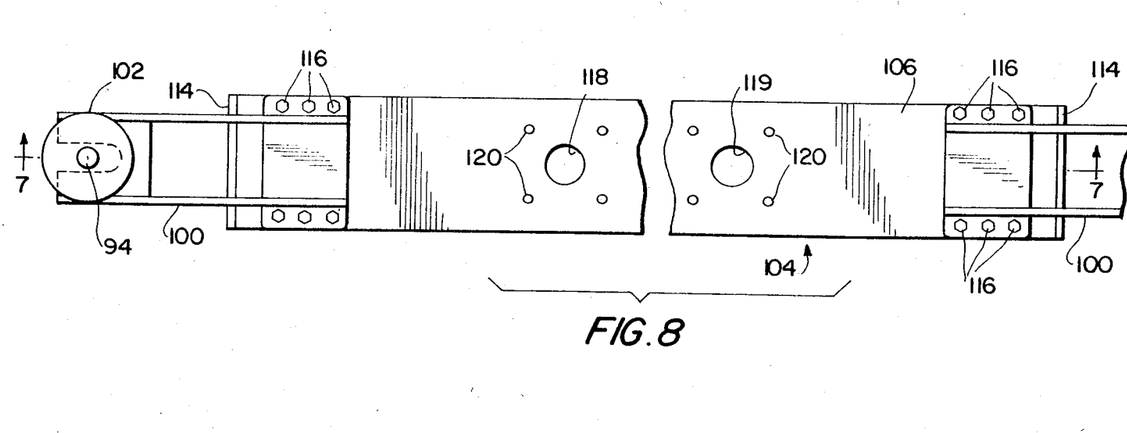
FIG. 8 is a fragmentary top plan view thereof.

Referring now to FIG. 7, the extruder 58 is mounted on a pair of support brackets 86 (only one of which is shown in FIG. 7), one of which is mounted on each side of the work station. Each of these support brackets 86 is fastened to a base member 88 that is fixed in position relative to the production line. At its upper end, the support bracket 86 is formed with a generally U-shaped yoke 90, between the arms of which a pivot pin 92 is fastened. The head of a threaded locking stud 94 is mounted for pivotal movement on this pivot pin 92. A second generally U-shaped yoke 96 is welded to the upper end of the support bracket 86. A support arm 100 is seated on the upper surface of the upper yoke 96, and a locking nut 102 is threaded on the upper end of the stud 94 to hold the support arm 100 securely in place. The pivotal mounting of the stud 94 permits fast release and fastening of the support arm 100 on the upper surface of the yoke 96. The construction is similar on the other side of the depositor.

The extruder 58 comprises a housing 104 that is formed from a solid billet of metal, preferably an aluminum alloy, by machining in it a cylindrical bore 105. This bore 105 forms in the billet, in effect, boundary walls including a top wall 106 (FIGS. 7, 10), a bottom wall 108 (FIGS. 7, 9), and opposing side walls 110, 112 (FIG. 10), respectively. A pair of end caps 114 are fastened to the opposite ends of the housing 104, respectively, to seal off the bore 105. The two support arms 100 are secured to the upper wall 106 of the housing by a plurality of threaded fasteners 116.

The top wall 106 of the housing is formed with a pair of openings 118, 119 respectively. Threaded openings 120 are disposed about each of these openings, to permit a manifold 122 (FIG. 5A) to be secured to the top wall of the housing. The manifold 122 provides a communication path through which icing or other material is supplied from the line 84 to the interior of the housing 104.

A balancing bar 124 (FIGS. 7, 10) is inserted within the bore 105 of the housing 104. The balancing bar 124 is formed with a solid central section 126 (FIG. 7) and with a pair of end sections 127, 128, that are alike in structure and that engage the wall of the housing in a slip fit, so as to form an enclosed left chamber 129 and an enclosed right chamber 130 (FIG. 7), within the bore of the housing.

Figure 10:
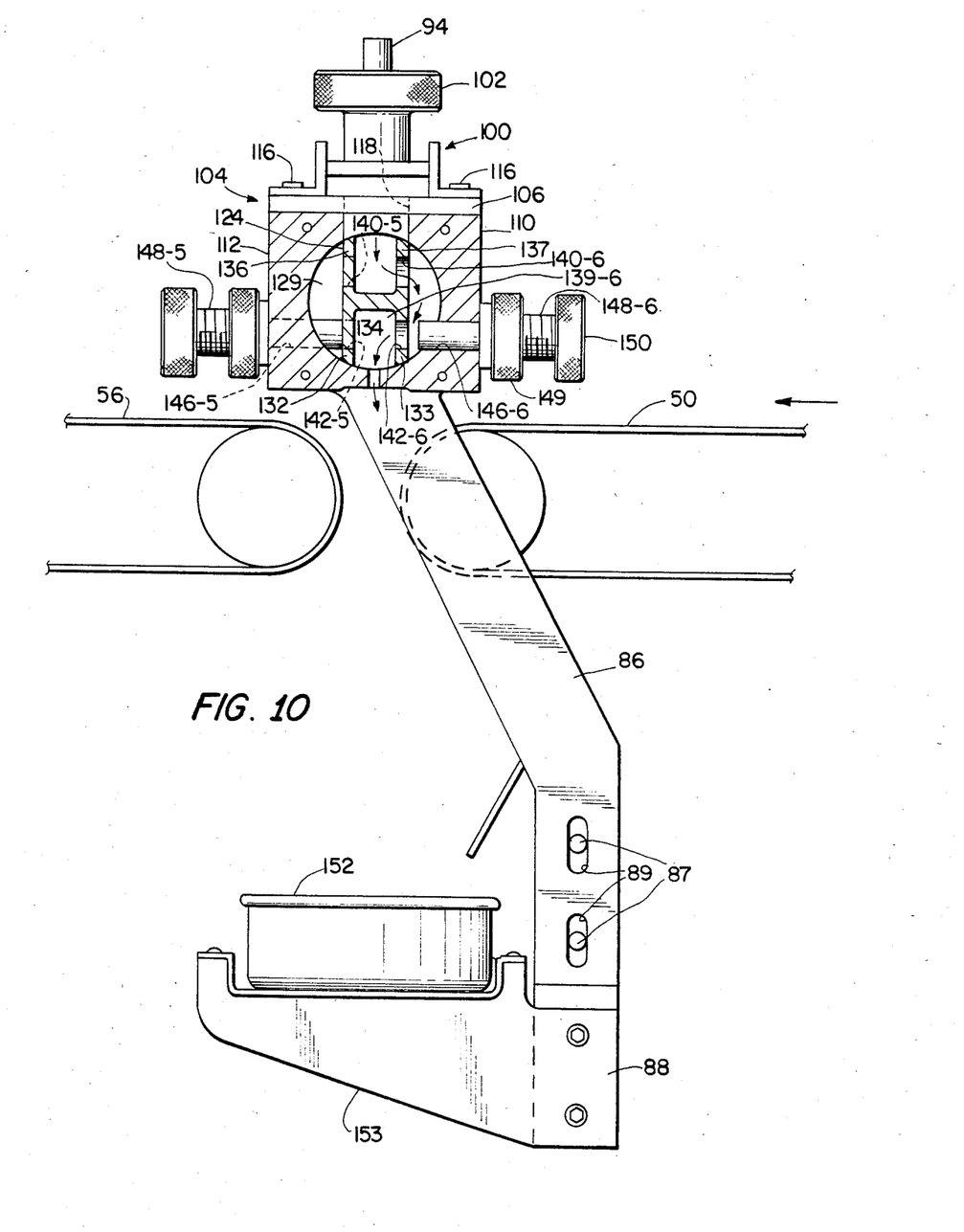
FIG. 10 is a fragmentary section in a vertical plane, which plane is parallel to the direction of movement of the production line, taken on the line 10—10 of FIG. 7, looking in the direction of the arrows, and showing by arrows on the drawing the flow path for a viscous icing through the depositing mechanism.

Referring now to the left chamber 129 in the housing, in FIGS. 7 and 10, the balancing bar within this left chamber is formed to have a generally H-shaped transverse section, as best shown in FIG. 10. Thus the balancing bar is machined with a pair of lower arms 132, 133 respectively, that are integral with a horizontal web 134 that forms the cross bar or bridging base member of the "H". The balancing bar is also machined with a pair of upper upright arms 136, 137 respectively, that, like the lower pair of arms, are integral with the cross bar web 134.

Referring to the left housing chamber 129, the lower pair of arms 132, 133 are seated against the inner surface of the lower wall 108 portion of the housing and form an essentially fluid-tight seal with it. Similarly, the upper arms 136, 137 of the balancing bar engage against the top wall 106 of the housing in a slip fit. In addition, as best shown in FIG. 7, the balancing bar is machined, in the part of it that is in the chamber 129, with five downwardly depending, transversely extending partitions 138-1, 138-2, 138-3, etc. respectively, each of which engages in slip fit fashion against the side wall portions 110, 112 and the bottom wall portion 108 of the housing, thus subdividing the left chamber 129, in its lower portion, into six separate small chambers 139-1, 139-2, 139-3, etc. respectively.

As best shown in FIG. 7, the upper upright arm 137 is formed with three circular orifices, 140-2, 140-4, and 140-6 respectively, the axes of which are in a common horizontal plane. The other upright arm 136 (not visible in FIG. 7) of the balancing bar is similarly formed with three other circular orifices, 140-1, 140-3, and 140-5 (not shown), respectively, all of whose axes lie in a common horizontal plane with the axes of each other and with the axes of the orifices 140-2, 140-4, and 140-6 in the other upright arm 137 of the balancing bar. These six orifices are thus staggered, being located first in one upright arm, then in the other. Thus, in FIG. 7, the orifices 140-2, 140-4, and 140-6 are all located in the upright arm 137. Similar orifices (not shown) are formed in the other upright arm 136, for a total of six orifices. Each of these six orifices is aligned, transversely relative to the housing 104, over an underlying one of the six small chambers 139-1, 139-2, 139-3, etc.

The lower arms 132, 133 are similarly formed with orifices. Thus the lower arm 133 is formed with three orifices 142-2, 142-4, and 142-6 respectively (shown in FIG. 7), that communicate with the small chambers 139-2, 139-4 and 139-6. The other lower arm 132 is similarly formed with three orifices (not visible in FIG. 7), for a total of six in the chamber 129. These orifices are staggered, first in one arm, then in the other, but always on the same side of the balancing bar as the orifice immediately above it in an upper arm.

The bottom wall 108 at the left of the housing (FIG. 7) is formed with six generally rectangular extrusion slots 144-1, 144-2, 144-3, etc. (FIG. 9), which are aligned respectively with the small chambers 139-1, 139-2, 139-3, etc., formed between the lower arms of the balancing bar. The right side of the extruder is similarly constructed.

This arrangement permits a flow of icing, referring to the left side of FIG. 7 and to FIG. 10 for explanatory purposes, from the supply line 84 (FIG. 5A), through the manifold 122, through the aperture 118 into the housing chamber 129, and into the common space between the upper arms 136, 137 above the cross bar 134 of the balancing bar. Under applied pressure, the icing then flows from this confined space out through the opening 140-6, then into the opening 142-6, as shown by the arrows in FIG. 10.

Figure 9:
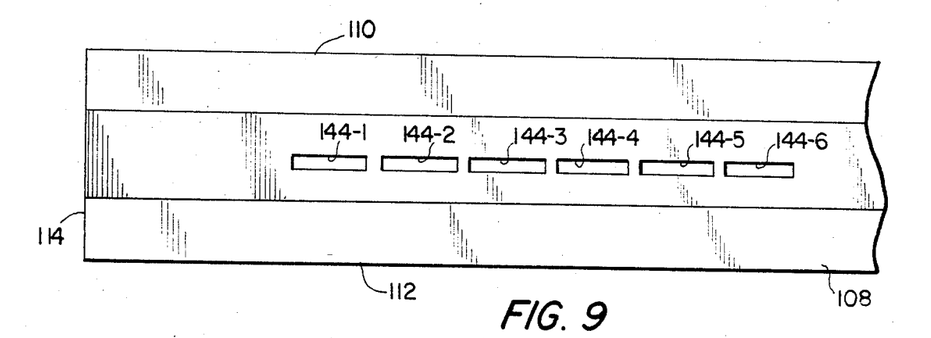
FIG. 9 is a fragmentary bottom view of the dispensing mechanism, showing the apertures through which the icing is extruded.

As shown in FIG. 10, the flowing icing forms a stream in what amounts to a manifold space between the opposed upper arms 136, 137 of the balancing bar, and between crossbar 134 of the balancing bar and the inner surface of the top 106 of the housing. To escape from this space within the left housing chamber 129, the icing, as shown in FIG. 10, follows the paths indicated by the arrows, reentering the space between the lower arms 132, 133 of the balancing bar through the opening 142-6 for the particular chamber 139-6 that is shown in FIG. 10. Each stream of icing within a particular small chamber 139-1, 139-2, etc. can then discharge from the housing through one of the extrusion slots 144-1, 144-2, etc. (FIGS. 7 and 9). In the case of the compartment 139-6 shown in FIG. 10, the discharge is through the extrusion slot 144-6.

The extrusion slots 144-1, etc. are formed on center lines that are two inches apart, for applying icing to cake ribbons that are two inches wide. The slots themselves 144-1, 144-2, etc., however, are preferably about 1¾" wide so that each strip of extruded icing would be deposited on the upper surface of the cake ribbon, leaving an uncoated marginal portion along each lateral edge of the cake ribbon, as shown in FIG. 7.

To assure uniform or substantially unifom thickness for each strip of extruded icing, the icing extrusion device 58 is similarly constructed on its right side, so that in general there is symmetry about a central plane relative to FIG. 7.

To permit individual adjustment of the extrusion rate through each of the extrusion slots 144-1, 144-2, 144-3, etc., from each of the small chambers 139-1, 139-2, etc. above each of these slots, an adjustment screw 148-1, 148-2, etc., (FIG. 10), is provided for each small chamber respectively. Thus, the housing side walls 110, 112, are formed with threaded bores 146-1, 146-2, etc. (for bore 142-6, see FIG. 10. An adjusting screw 148-6 is threaded into the bore 146-6 (FIG. 10). This adjusting screw 148-6 is provided with an external locking nut 149 and an adjusting knob 150. By adjusting the distance from the innnermost end of the adjusting screw 148-6 to the aligned opening 142-6 in the lower arm 133 of the balancing bar, the clearance is adjusted, to control the flow of icing. By having such an adjusting screw for each of the twelve small chambers 139-1, 139-2, etc., and thus for each of the extrusion slots 144-1, 144-2 etc., substantially uniform deposits of icing can be attained from all of the twelve extrusion slots.

As best shown in FIG. 10, the icing extrusion device 58 is mounted on a support bracket 86 that is secured to a support base 88 by a plurality of fasteners 87 that extend through vertically elongate slots 89, so that the support bracket 86 is adjustable in height, to permit adjustment of the elevation of the extruder 58 with respect to the upper surface of the cake. Moreover, the extruder is positioned in a gap between the conveyor system 50 at the second work station and the conveyor system 56 at the third work station. The extrusion slots 144 are so positioned that any extruded icing, if not deposited on a cake, will fall into the gap. To collect any such icing, a tray 152 is mounted on a bracket 153 that is fastened to the base 88. The tray 152 is positioned to catch any icing that might fall into the gap between the two conveyors 50, 56 respectively.

To apply particulate foodstuff on top of the icing, such as, for example, chopped walnuts, sugar crystals, small pieces of candy, and the like, special care must be used in the process of the present invention because of the need for simultaneous application of the particles to twelve different iced ribbons of cake. While this discussion is in terms of a preferred embodiment of the invention in which there are twelve ribbons of cake, the actual number in any particular production line could be more or less. To accomplish the dispensing task correctly, a commercially available dispensing hopper was modified.

Figure 11:
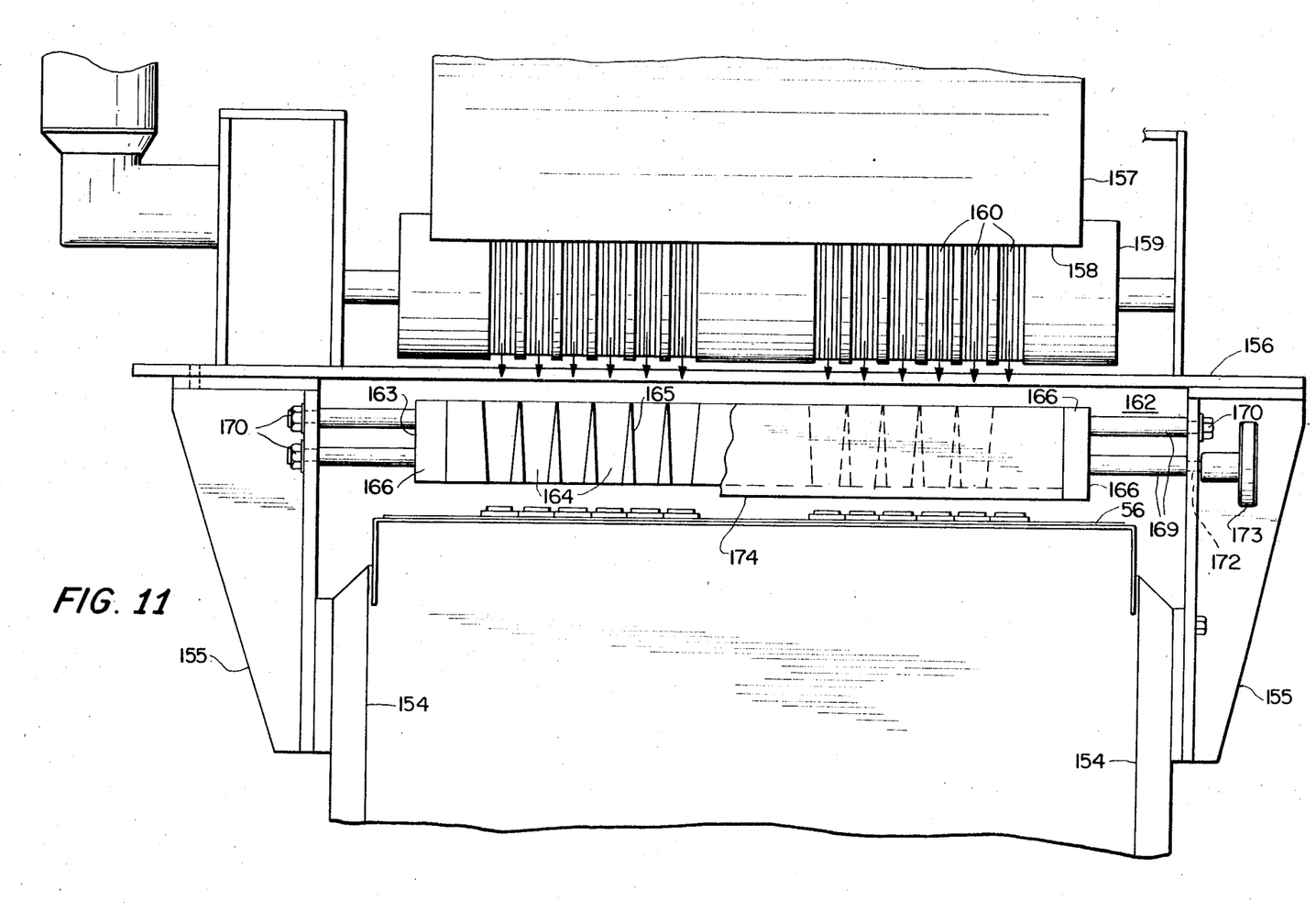
FIG. 11 is a fragmentary part elevation, part section in a plane transverse to the direction of movement of the production line, of the mechanism that can be used to deposit nut pieces or other like food fragments on the iced pieces of cake.
Figure 12:
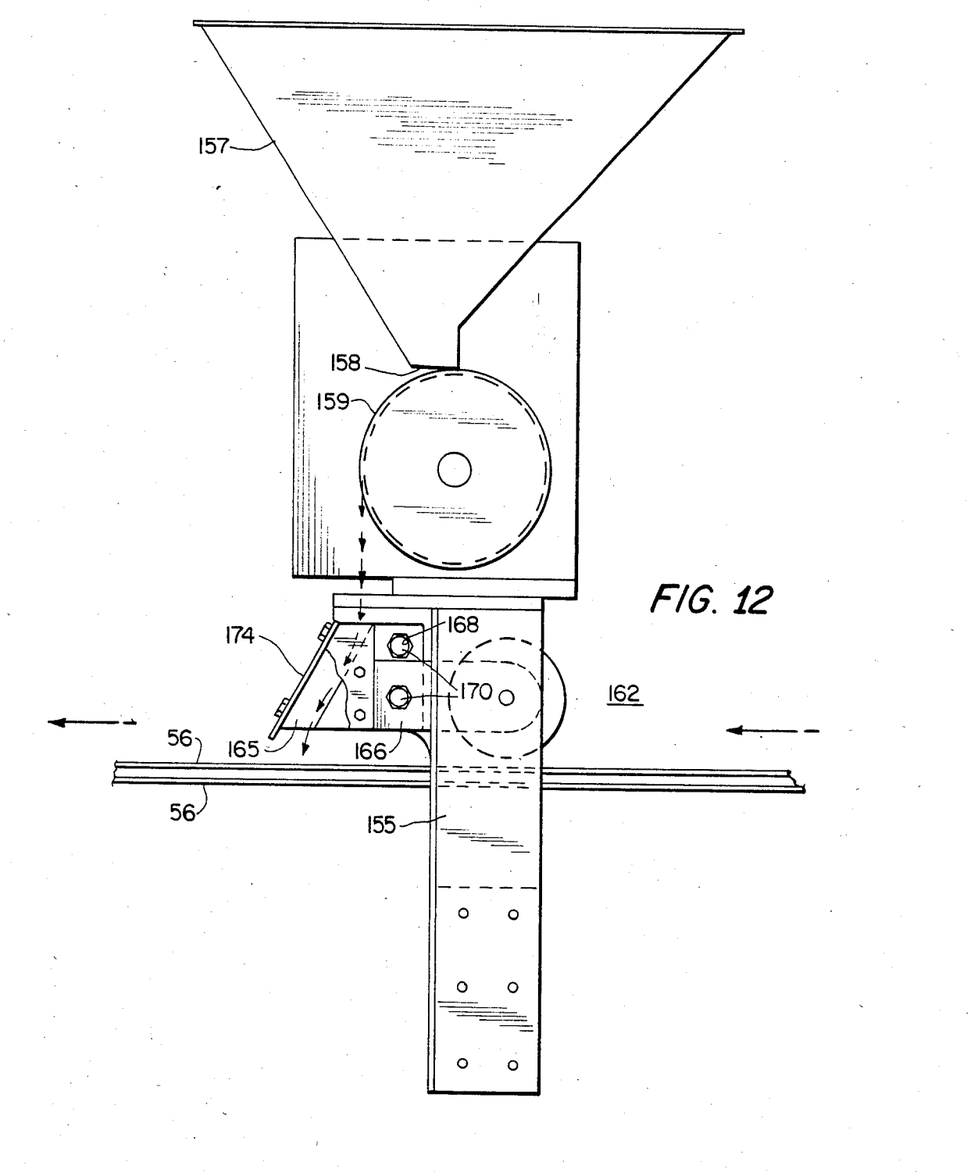
FIG. 12 is a fragmentary side elevation thereof, with the path followed by the nut pieces or other food fragments being dispensed indicated by a series of small arrows, and with the direction of travel of the conveyor shown by an arrow.
Figure 13:
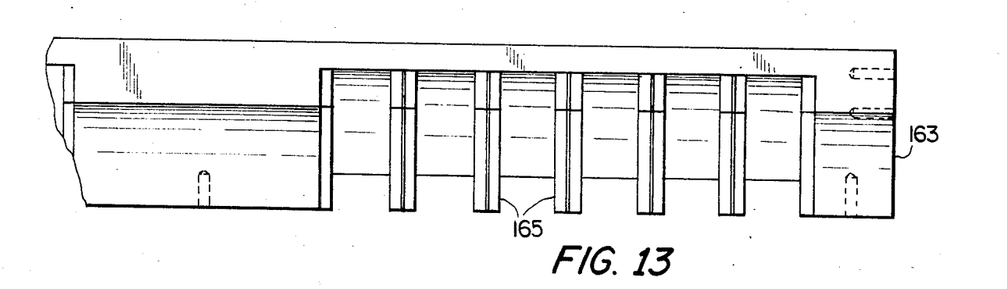
FIG. 13 is a fragmentary top plan view of the guide for the nuts or other food fragments, the guide being rotated 90° from the position in which it is seen in FIG. 11.
Figure 14:
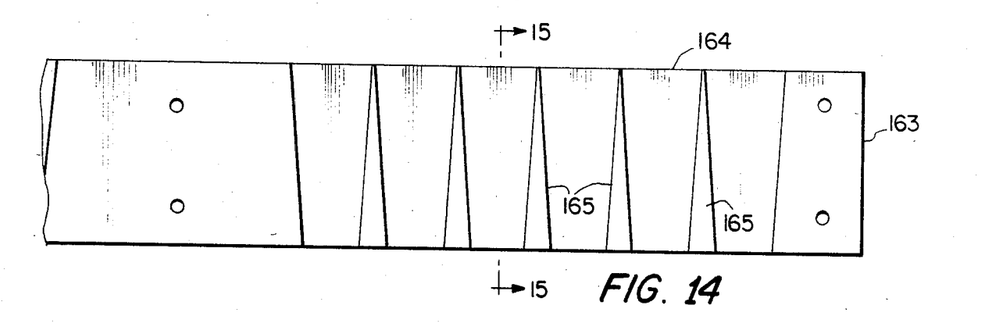
FIG. 14 is another fragmentary view thereof, showing the guide rotated 90° from its position in FIG. 13.
Figure 15:
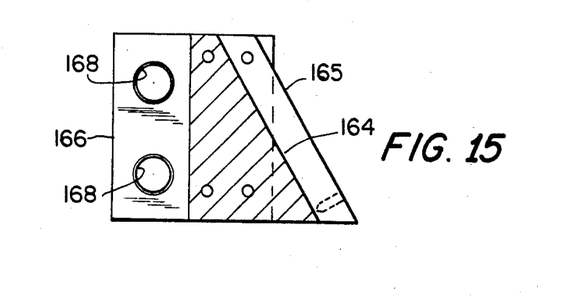
FIG. 15 is a section taken on the line 15—15 of FIG. 14, looking in the direction of the arrows.

Referring now to FIGS. 11-15, and especially to FIGS. 11 and 12, support members 154 are provided and, on each side of the conveyor 56 of the third work station, on each support base 154, brackets 155 are mounted that extend upwardly above the level of the conveyor. A platform 156 is mounted on the upper ends of the side brackets 155 and extends across the width of the conveyor, transversely of its direction of movement. A hopper 157 is disposed above this platform 156 on a supporting frame (not shown in detail) with its discharge chute 158 disposed in close proximity to the upper surface of a dispensing roller 159. This dispensing roller is formed in its surface with a plurality of spaced-apart circumferential recesses 160, of generally rectangular transverse section. The rate of discharge of the particles from the hopper into the recesses 160 can be adjusted by control over the speed of rotation of the drum roller 159. In operation, generally, the equipment is adjusted so that nuts or other food particles are discharged from the discharge chute 158 of the hopper 157 into the recesses 160.

To insure accurate dispensing of the particulate material, a special guide apparatus 162 is interposed between the dispensing roller 159 and the iced cake on the conveyor, in proper position to receive particulate material from the roller 159 and dispense it onto the icing. This guide apparatus 162 is mounted to be adjustable transversely of the conveyor belt, more accurately to permit dispensing of the particles onto the desired locations on the iced cake ribbons.

The guide apparatus 162, as shown in FIGS. 11-15, consists of an assembly in which the major component is a sheet aluminum structure 163 that is formed with a plurality of channels 164 that are separated from each other by guide walls 165. As shown in FIG. 11, these guide walls 165 preferably converge toward one another from top to bottom, so that the channels 164 at their upper ends are wide enough to receive particles discharged from each of the recesses 160 in the dispensing roller 159 respectively, while the throat at the discharge end of each channel 164 may be any desired dimension, but preferably the same as the width of the icing or topping and generally less than the exemplary two inch cake ribbon width.

This sheet aluminum structure 163 is secured at each of its ends to guide blocks 166, respectively. Each of the guide blocks 166 is formed with a pair of openings 168. A pair of tie rods 169 (FIG. 11) are passed through the openings 168 in the two guide blocks, in a fit that permits relative sliding movement on the upper tie rod. The ends of the upper tie rod are fastened to the brackets 155, as illustrated in FIG. 11, by nuts 170. An adjusting screw 172 is threaded at one of its ends into one end of the lower of the guide blocks 166, and at its other end is journalled through an opening in one flange of a side bracket 155. An adjusting knob 173 is secured to the end of the adjusting screw 172 to permit rotation of the adjusting screw 172 in one direction and another. Upon rotation of the adjusting knob 173, the entire assembly 162 can be caused to move transversely of the conveyor belt by sliding movement on the upper tie rod, in one direction or the other, so as precisely to position the lower ends of the discharge chutes 158 over the icing layers on the cake ribbons, respectively.

Preferably, as best shown in FIG. 12, a tough, transparent plastic sheet 174 is mounted over the discharge channels 164 as a protective and sanitary cover.

Figure 16:
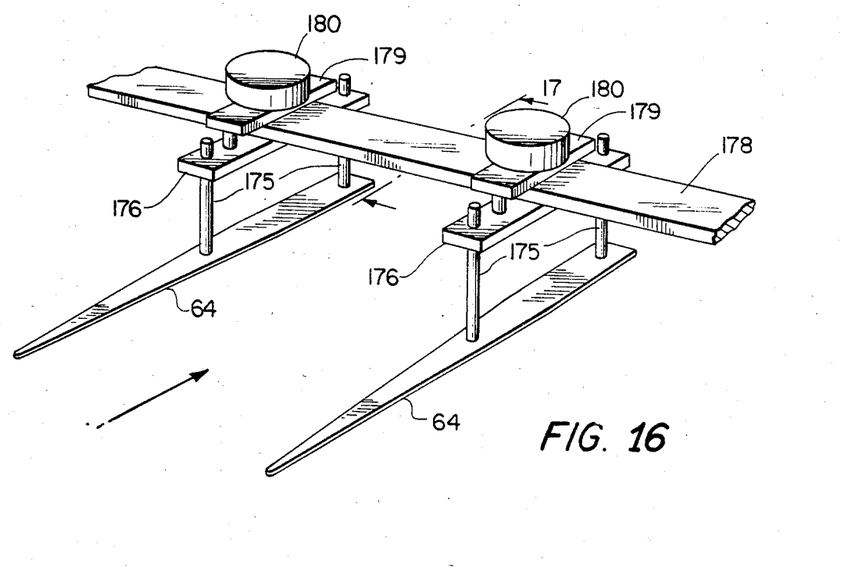
FIG. 16 is a fragmentary perspective view, on an enlarged scale relative to FIGS. 5 and 6, of a lane divider for spacing apart the iced or topped pieces of cake transversely of one another.
Figure 17:
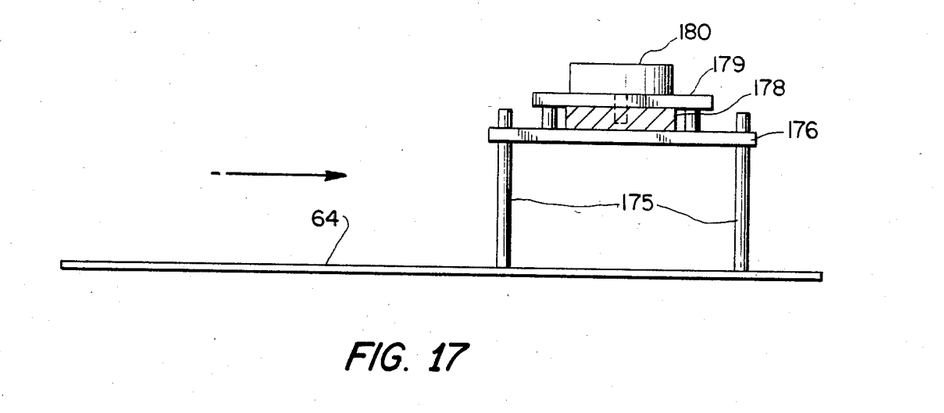
FIG. 17 is a section thereof, taken on the line 17—17 of FIG. 16, looking in the direction of the arrows.

At this point in the production line, in preparation for subsequent operations, it is important that the several contiguous iced cake ribbons be separated and physically spaced from each other. To this end, four lane dividers 64 (FIGS. 6A, 16, 17) are disposed in separate, spaced locations transversely across the width of the conveyor belt. They are located so as to divert and separate the twelve cake ribbons into six sets of contiguous pairs of iced cake ribbons, in which each pair is spaced from the next adjacent pair.

These lane dividers 64 preferably have the construction shown in FIG. 12, which is generally a plough or V-shape. Each plough-shaped lane divider 64 is relatively narrow at its upstream end, and has its greatest width, transversely of the belt, at its downstream end. It is generally shaped like an arrow head, with the point positioned, during operation, for entering into the already existing slit between adjacent cake ribbons. The base of each plough-shaped divider 64 is formed of a material that can engage against the surface of the underlying conveyor belt 56 but that slides easily over the surface of the belt, which preferably is Teflon-coated. Each plough-shaped divider 64 is suspended from above on a beam 178, that extends transversely of the conveyor belt and that is adjustably mounted in a fixed position. Each divider 64 is suspended from this beam 178 by a structure that includes a pair of upright rods 175 that are secured at their lower ends to the lane divider 64 and at their upper ends to a strap 176. Each strap 176 is suspended from the cross geam 178 by a structure that includes a slidable strap 179 that seats on the beam 178 and an adjusting knob 180 that facilitates movement of its associated lane divider transversely of the conveyor.

A second set of lane dividers 66 (FIG. 5A), six in number, is disposed downstream of the first set of lane dividers 64. Except for their number, these lane dividers are constructed and disposed similarly to the initial set of lane dividers 64. This second set of line dividers 66 separates each pair of iced cake ribbons and spaces each separate cake ribbon from each of the others, so that as the cake ribbons proceed further along the production line, there are twelve separate cake ribbons, spaced laterally from each other.

Despite all attempts to direct the particulate food onto the icing layers, and to press it down in place with the roller 62, some inevitably finds its way onto the surface of the conveyor belt. In addition, the actions of the two sets of lane dividers result in some displacement. Thus, as the twelve separated, iced cake ribbons pass from the conveyor belt 56 of the third work station over onto the conveyor belt 68 at the fourth work station, a gap is provided which is easily bridged by the cake ribbons. However, any loose crumbs and loose particles of food drop off the conveyor belt 56 into the gap. For this purpose, a tub 180 (FIG. 5B) is positioned beneath the gap, to catch any falling particles.

At the fourth work station, the iced cake ribbons are cut into squares by a travelling rotary knife assembly. A gang 72 of rotary knives 182 of a type that is well known, is used for this purpose. Each circular knife 182 in this assembly is continuously rotated and is continuously carried through a generally rectangular path, the long reaches of the rectangle being its upper and lower reaches, which extend transversely of the cake path. These two reaches are skewed relative to each other. The upper reach of the path of the knives is at right angles to the path of the cake, but the lower reach is angled, so that the knife always is at a right angle to the path of the cake, but travels in the direction of travel of the cake at the same velocity as the cake, so that the travelling knife cuts square or rectangular cake pieces. This is a conventional item of equipment, as to these functions.

In the present process, it has been found advantageous to heat each of the knives between each movement through a cutting cycle, to avoid icing sticking.

Figures 18, 19, 20:
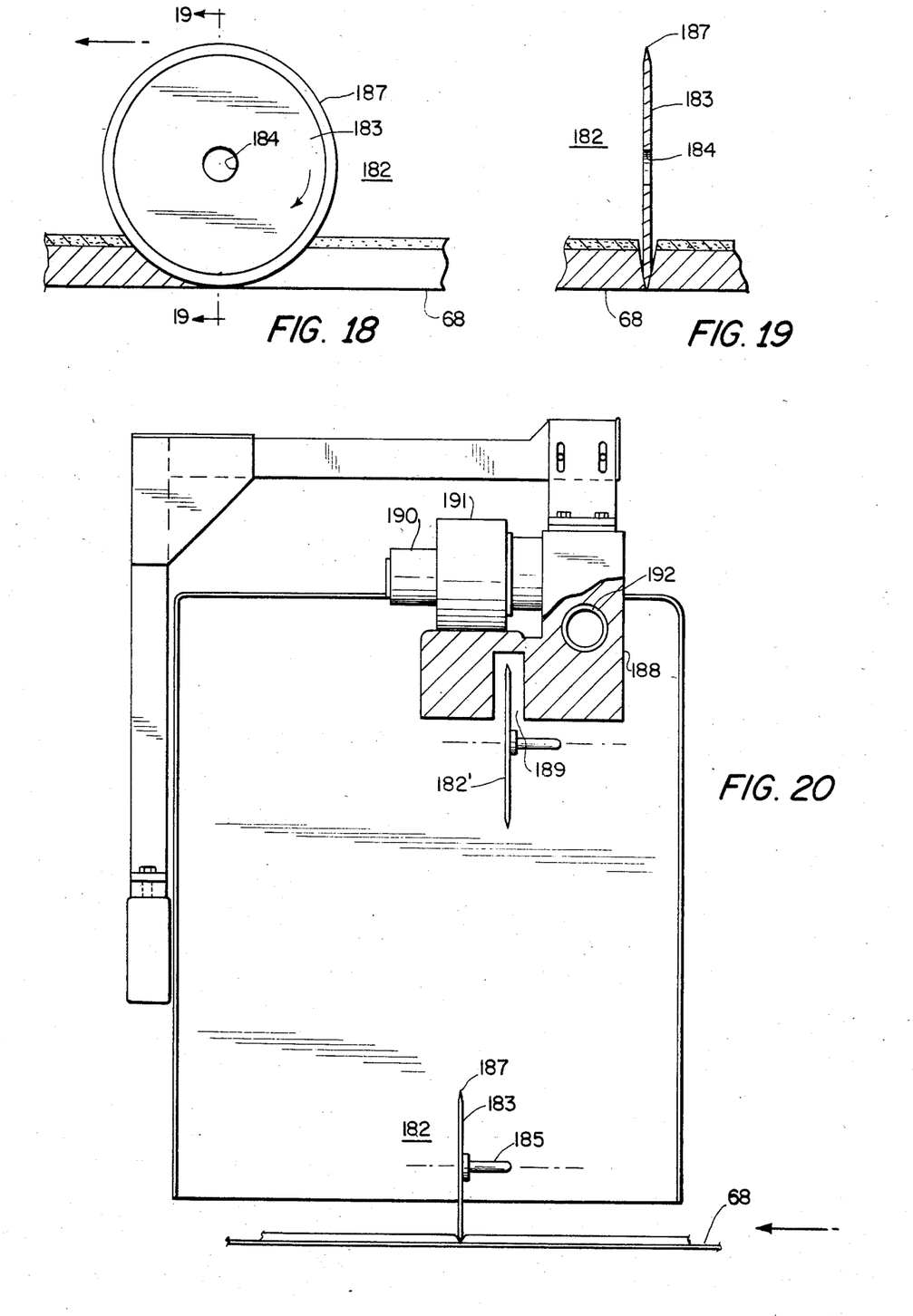
FIG. 18 is a fragmentary part side elevation, part section, showing a roll knife in the process of cutting the iced cakes transversely of the direction of movement of the production line, into the preferred square shape.
FIG. 19 is a section taken on the line 19—19 of FIG. 18, looking in the direction of the arrows.
FIG. 20 is a fragmentary schematic part section, part side elevation of the roll knife assembly showing the mechanism for heating the knives between cutting operations, and also showing one of the lower knives in cutting position.

To this end, as best shown in FIGS. 18-20, each circular rotary knife 183 is formed with a central aperture 184 for mounting the knife on a rotary shaft 185 (FIG. 20). Each knife is provided with a peripheral cutting edge 187. When the cutting edge 187 is applied to an iced cake, as shown for example in FIG. 18, then the normal V-shape of the knife near the cutting edge 187 tends to force the severed piece of cake from the remainder of the uncut ribbon of cake, as indicated schematically in FIG. 19. In addition to mildly pushing the cut piece of cake away from the remainder of the cake ribbon, the slight V-shape of the cutting edge tends to push the icing down against the underlying edges of the cake, smoothing it in place and anchoring it further to the cake. At the completion of its cutting movement across the conveyor belt, as the blade is lifted up and away from the conveyor belt and cake, the cutting head is easily moved away from the iced cake, without snagging the layer of icing.

As is shown schematically in FIG. 20, when one blade 182 is engaged in its cutting cycle, at least one other rotary blade 182', that is to be used in a subsequent cutting cycle, is being heated so that it will have an elevated temperature when next used for cutting.

The cutting knives 182 are mounted in an assembly (not shown in detail here) of a conventional type, that moves each blade, in its cutting cycle, in the same direction and at the same speed as the cake ribbons on the conveyor belt.

In between cutting cycles, each blade is passed through a wiper (not shown) which removes any adhering material, and through the heating chamber 189 of a simple heater 188. In one embodiment, this heating assembly consists of a motor 190 that is connected to drive a plurality of fans (not shown) within a housing 191, to create a stream of air that is passed over electrical resistance heaters 192. The heated air is then directed into the chamber 189, for heating the rotary cutting blades 182.

General

While the foregoing description refers to the production of snack food products based on cake squares having a thickness of about 1½ ", this is simply a preferred shape and set of dimensions, and the process of the invention can be applied to the production of cakes of other shapes and sizes.

Generally, the use of a bonding layer is not needed except with a sticky, heavy icing or topping composition, where the icing tends to stick to other surfaces than the cake, and does not adhere well to the cake. With such an icing or topping, a creme or fruit jelly bonding layer serves a valuable function. Such a fluid yet tacky layer penetrates well into the cake, and causes wetting to occur either between itself, or between the cake surface to which it has been applied, and the icing or topping layer. The cake and icing or topping then tend to stay together during subsequent processing steps, indicating that the bonding between the icing or topping and the cake surface, or bonding layer surface, overcomes the tendency of the icing or topping to stick to other surfaces.

When the icing or topping is not sticky, the bonding layer can be omitted if desired. Depending upon the flavor and mouth feel results desired, a bonding layer may be used even with an icing or topping composition that is not sticky.

The compression roller 62 (FIG. 5A) is useful with sticky icing formulations, where a bonding layer is used, to insure good penetration of the bonding layer into the cake. When particulate food is sprinkled on top of the icing or topping, the pressure roller is also useful for pressing the food particles into the icing or topping. For a sticky peanut butter icing, the compression roll 62 is preferably steam heated with saturated steam, so that it operates at a surface temperature of about 150° F.–160° F. When the compression roller is used primarily for pressing nuts or like food particles into the icing layer, and when the icing layer is not sticky, the compression roll may be operated at room temperature.

The plough-like shape of the lane dividers 64, 66 is useful with cakes having all types of icing, but especially with sticky icings. The taper of these lane dividers permits them to perform their separation function and their flat thin profile in elevation insures a minimum opportunity for contact between the lane dividers and the icing layers on the cake ribbons on either side of it. The broad downstream dimension of each lane divider, adjacent the surface of the conveyor belt, assures good separation of the adjacent cake ribbons at the opposite sides of a given lane divider.

When the cake is approximately ½" deep and about 2" by 2", the icing or topping thickness generally will be in the range from about 1/32 of an inch to about 3/16 of an inch. These thicknesses can be adjusted to suit consumer tastes.

While not shown in FIGS. 5 and 6, the distance from the point where the batter is extruded onto a conveyor belt for passage through a tunnel oven, and the point where the baked and subsequently cooled cake ribbons enter the production line illustrated in these drawings, may be quite substantial. Both the baking and cooling steps may require substantial distance coverage for the desired heat exchanges to occur. These distances may be increased when the production line is operated at a higher rate of speed.

Three different versions of the snack food product are preferred at present. In one of these, a yellow cake batter is prepared, extruded, baked, and processed. The bonding layer is strawberry jelly, over which a layer of strawberry-flavored icing is extruded. The coated cake ribbons are compressed to insure good bonding, cut transversely in squares, enrobed in dark chocolate, and decorated with milk chocolate squiggles.

In a second embodiment, a dark brown cake is prepared, and a fudge icing is extruded directly onto the surface of the cake ribbons. Chopped walnuts are sprinkled over the surface of the fudge icing, and pressed into the icing by the compression roller. After transverse cutting, the squares are enrobed in dark chocolate, then decorated with milk chocolate squiggles.

In a third embodiment, a golden yellow cake is prepared and slit into ribbons. A thin peanut butter based creme is applied as a bonding layer, then a thick, sticky peanut butter icing is applied. Following compression by a heated roll, and transverse cutting, the squares are enrobed with milk chocolate then decorated with dark chocolate squiggles.

A peanut butter creme formulation that is suitable for use in the practice of the invention may contain, for example:

| Ingredient | Percent by Weight |
| --- | --- |
| Peanut butter | 40–45 |
| High fructose corn syrup | 35–40 |
| Emulsified shortening | 12–17 |
| Milk | 1.5–3 |
| Water | 3–6 |
| Salt | 0.5 |
| Emulsifier | 0.2–1 |

-continued

| Ingredient | Percent by Weight |
|---|---|
| Flavorants | To Taste |

A suitable peanut butter icing formulation may contain:

| Ingredient | Parts by weight |
|---|---|
| Peanut butter | 800–900 |
| Milk | 50–65 |
| Crystalline dextrose | 50–70 |
| Food grade starch | 50–65 |
| Water | 50–75 |
| Emulsifier | 15–25 |

Conventional formulations can be used for the fruit flavored and fudge iced versions of the invention. For peanut butter icings, the peanut butter content (90% ground peanuts) should be at least 55% by weight of the icing, for good body, flavor, mouth feel and aroma.

To minimize sticking, the oil content of ordinary creme and icing formulations may be increased slightly over what is conventional for such compositions. An increase of 1% to 2% is often sufficient to reduce or even eliminate sticking to the transverse cutting knives, for example.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for making a food product, said food product comprising:

a piece of cake having at least one exposed external generally planar coatable surface, a bonding layer coated over said surface that is selected from the group consisting of jelly and creme, that prior to coating of said cake surface is sufficiently fluid so that upon coating thereon it penetrates into the cake beneath said surface, said bonding layer being applied as a strip of lesser extent in one dimension than said cake surface so as to leave two opposite marginal portions of said cake uncoated while extending as a continuous layer between said uncoated margins, and a sticky icing coated over said entire bonding layer and over said uncoated marginal portions of said cake surface as a continuous layer of icing, said iced cake having been compressed by a compressive force applied to said entire icing layer on said cake surface by a pressure bearing member, said icing layer being pressed firmly into engagement with said bonding layer and being anchored to said cake by said bonding layer, said process comprising:

applying said bonding layer of creme or jelly to said cake surface and permitting the creme or jelly to penetrate into the cake below its said coatable surface, then applying over said entire layer of creme or jelly, and in contact therewith, and over said uncoated marginal portions of said cake surface and in contact therewith, a continuous topping layer of a sticky icing, applying a pressure bearing member to said topping layer to press it into intimate contact with said layer of jelly or creme, and to press said layer of jelly or creme and said cake together, whereby said topping layer becomes bonded to said layer of jelly or creme and becomes anchored to said cake by said bonding layer, and then enrobing the entire iced piece of cake in a solidifiable enrobing liquid that solidifies upon standing to form a continuous enrobing layer.

2. A process for making a food product, said food product comprising:

a piece of cake having at least one exposed external generally planar coatable surface, a bonding layer coated over said surface that is selected from the group consisting of jelly and creme, that prior to coating of said cake surface is sufficiently fluid so that upon coating thereon it penetrates into the cake beneath said surface, said bonding layer being applied as a strip of lesser extent in one dimension than said cake surface so as to leave two opposite marginal portions of said cake uncoated while extending as a continuous layer between said uncoated margins, and a sticky icing coated over said entire bonding layer and over said uncoated marginal portions of said cake surface as a continuous layer of icing, said iced cake having been compressed by a compressive force applied to said entire icing layer on said cake surface by a pressure bearing member, said icing layer being pressed firmly into engagement with said bonding layer and being anchored to said cake by said bonding layer, said process comprising:

applying said bonding layer of creme or jelly to said cake surface and permitting the creme or jelly to penetrate into the cake below its said coatable surface, then applying over said entire layer of creme or jelly, and in contact therewith, and over said uncoated marginal portions of said cake surface and in contact therewith, a continuous topping layer of a sticky icing, and then applying a pressure bearing member to said topping layer to press it into intimate contact with said layer of jelly or creme, and to press said layer of jelly or creme and said cake together, whereby said topping layer becomes bonded to said layer of jelly or creme and becomes anchored to said cake by said bonding layer, said layer of jelly or creme being a layer of peanut butter creme, said icing being a peanut butter icing, and wherein said pressure bearing member is a roller that is heated to a surface temperature in the range from 150° F. to 160° F.

* * * * *